United States Patent
Vokaliga et al.

(10) Patent No.: US 11,386,121 B2
(45) Date of Patent: Jul. 12, 2022

(54) AUTOMATED CLOUD PROVIDER CREATION AND SYNCHRONIZATION IN AN EMBEDDED CONTAINER ARCHITECTURE

(71) Applicant: EMC IP HOLDING COMPANY LLC, Hopkinton, MA (US)

(72) Inventors: Deepak Vokaliga, Hopkinton, MA (US); Kenneth Byrne, Knockraha (IE); Warren Fleury, Ballincollig (IE); Thiago Santos, Carrigtwohill (IE)

(73) Assignee: Dell Products, L.P., Hopkinton, MA (US)

( * ) Notice: Subject to any disclaimer, the term of this patent is extended or adjusted under 35 U.S.C. 154(b) by 152 days.

(21) Appl. No.: 17/033,809

(22) Filed: Sep. 27, 2020

(65) Prior Publication Data

US 2022/0100776 A1 Mar. 31, 2022

(51) Int. Cl.
*G06F 16/27* (2019.01)
*H04L 67/1097* (2022.01)
*G06F 11/14* (2006.01)
*G06F 8/61* (2018.01)
*G06F 9/54* (2006.01)

(52) U.S. Cl.
CPC .............. *G06F 16/27* (2019.01); *G06F 8/61* (2013.01); *G06F 9/544* (2013.01); *G06F 11/1464* (2013.01); *G06F 11/1469* (2013.01); *H04L 67/1097* (2013.01); *G06F 2201/84* (2013.01)

(58) Field of Classification Search
CPC .... G06F 11/1464; G06F 11/1469; G06F 8/61; G06F 9/544; G06F 2201/84; G06F 16/27; H04L 67/1097
See application file for complete search history.

(56) References Cited

U.S. PATENT DOCUMENTS

| | | | |
|---|---|---|---|
| 10,185,596 B2 * | 1/2019 | Roese | G06F 9/5072 |
| 10,334,044 B1 * | 6/2019 | Bigman | G06F 3/0607 |
| 10,924,340 B1 * | 2/2021 | Iyengar | H04L 41/0895 |
| 11,063,745 B1 * | 7/2021 | Du | H04L 9/0825 |
| 2011/0231670 A1 * | 9/2011 | Shevchenko | H04L 63/0815 709/225 |
| 2014/0279201 A1 * | 9/2014 | Iyoob | H04L 67/10 705/26.7 |

(Continued)

*Primary Examiner* — Merilyn P Nguyen
(74) *Attorney, Agent, or Firm* — Anderson Gorecki LLP (57) ABSTRACT

A SSMA (Storage System Management Application) automates creation of a cloud provider on a cloud repository. The SSMA instructs a CTS (Cloud Tethering Subsystem) to create the cloud provider, which causes the CTS to establish a secure connection to the cloud repository. The cloud repository creates the cloud provider and returns identifying information. The CTS then tests the connection to verify that the cloud provider is reachable at the cloud repository. The SSMA also instruct a solution enabler to install the cloud provider in the storage system embedded operating system. The SSMA also implements a cloud provider synchronization verification process, which enables the SSMA to determine if there are any differences between lists of cloud providers maintained by the CTS and the embedded operating system. If any differences are detected, the SSMA automates the process of installing the correct set of cloud providers in the storage system embedded operating system.

20 Claims, 4 Drawing Sheets

(56) References Cited

U.S. PATENT DOCUMENTS

| | | | |
|---|---|---|---|
| 2015/0222723 A1* | 8/2015 | Adapalli | G06Q 10/067 705/26.41 |
| 2018/0089224 A1* | 3/2018 | Muthuswamy | G06F 16/13 |
| 2020/0099721 A1* | 3/2020 | Golan | H04L 63/20 |
| 2020/0410418 A1* | 12/2020 | Martynov | G06F 11/1461 |
| 2021/0271565 A1* | 9/2021 | Bhavanarushi | G06F 9/45558 |
| 2021/0382912 A1* | 12/2021 | Horowitz | H04L 63/166 |

* cited by examiner

AUTOMATED CLOUD PROVIDER CREATION AND SYNCHRONIZATION IN AN EMBEDDED CONTAINER ARCHITECTURE

FIELD

This disclosure relates to computing systems and related devices and methods, and, more particularly, to a method and apparatus for enabling automated cloud provider creation and cloud provider synchronization in an embedded container architecture.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A method and apparatus for enabling automated cloud provider creation and cloud provider synchronization in an embedded container architecture is provided. In some embodiments, a storage system management application includes control logic configured to automate the process of creating a cloud provider, which is an instance of cloud storage on a cloud repository. The storage system management application has control logic to instruct a cloud tethering subsystem to create the cloud provider. The cloud tethering subsystem establishes a secure connection to the cloud repository, and the cloud repository creates the cloud provider. The cloud repository then returns the cloud provider name and UUID. The cloud tethering subsystem tests the connection to the cloud repository, and returns the cloud provider name and UUID to the storage system management application. The storage system management application also has control logic to instruct a solution enabler to install the cloud provider (e.g. cloud provider name and UUID) in the storage system embedded operating system once the cloud provider has been created on the cloud repository.

The storage system management application also includes control logic configured to implement a cloud provider synchronization verification process. The cloud provider synchronization verification process enables the storage system management application to determine if there are any differences between a list of cloud providers maintained by the cloud tethering subsystem and the list of cloud providers in the storage system's embedded operating system. If any differences are detected, the two systems are not synchronized, and the storage system management application causes the list of cloud providers in the embedded operating system to be adjusted to coincide with the list of cloud providers maintained by the cloud tethering subsystem.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
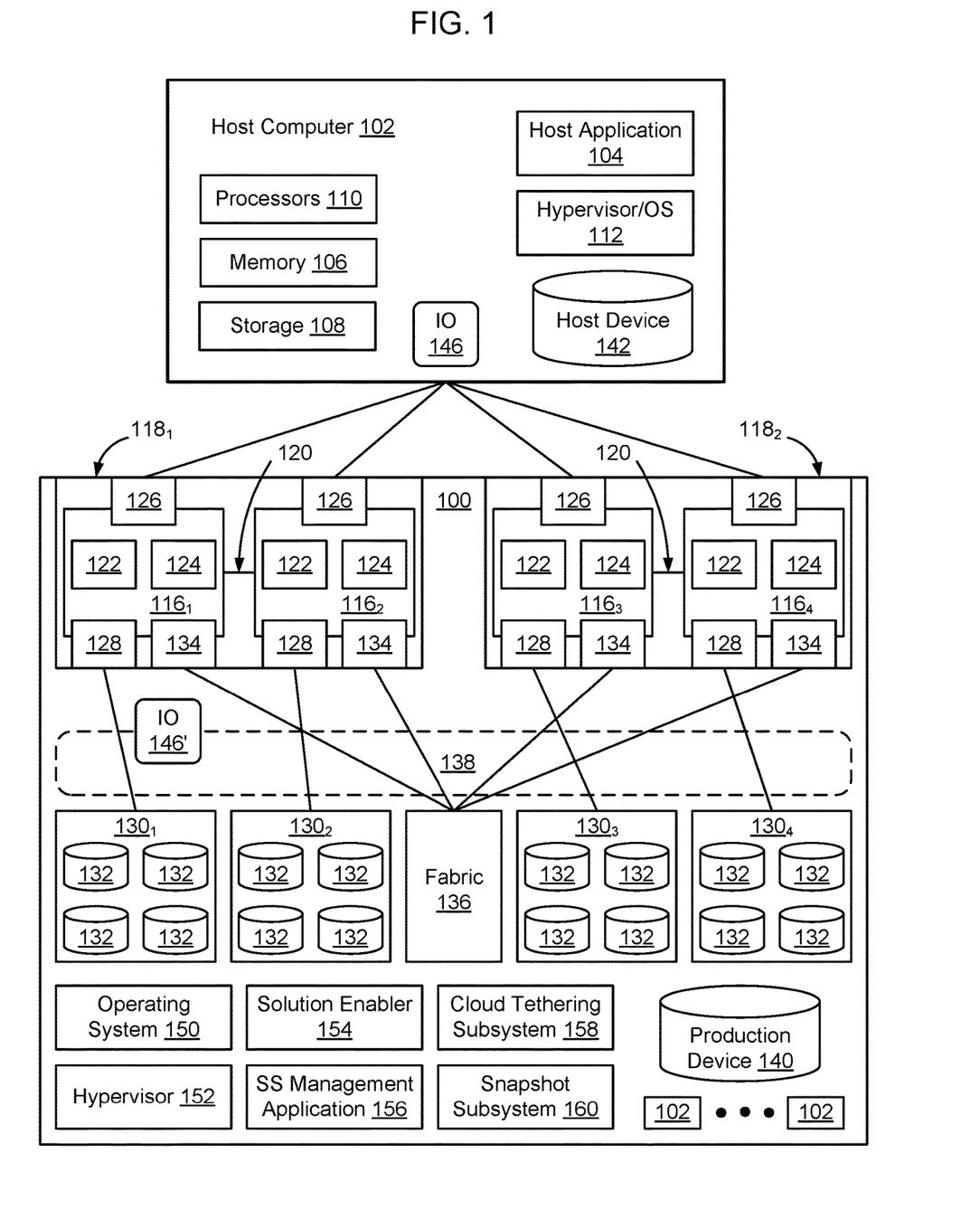
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140 (zoning).

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. For example, to protect the production device 140 against loss of data, a snapshot (point in time) copy of the production device 140 may be created and maintained by the storage system 100. If the host computer 104 needs to obtain access to the snapshot copy, for example for data recovery, the snapshot copy may be linked to a logical storage volume (Tdev) and presented to the host computer 104 as a host device 142. The host computer 102 can then execute read/write IOs on the Tdev to access the data of the snapshot copy.

As shown in FIG. 1, in some embodiments the storage system 100 has an operating system 150, and one or more system applications. Example system applications shown in FIG. 1 include a hypervisor 152, a solution enabler 154, a storage system management application 156, a cloud tethering subsystem 158, and a snapshot subsystem 160. Each of these components is described in greater detail below. The interrelationship between several of these components is also shown in greater detail in FIG. 2.

Figure 2:
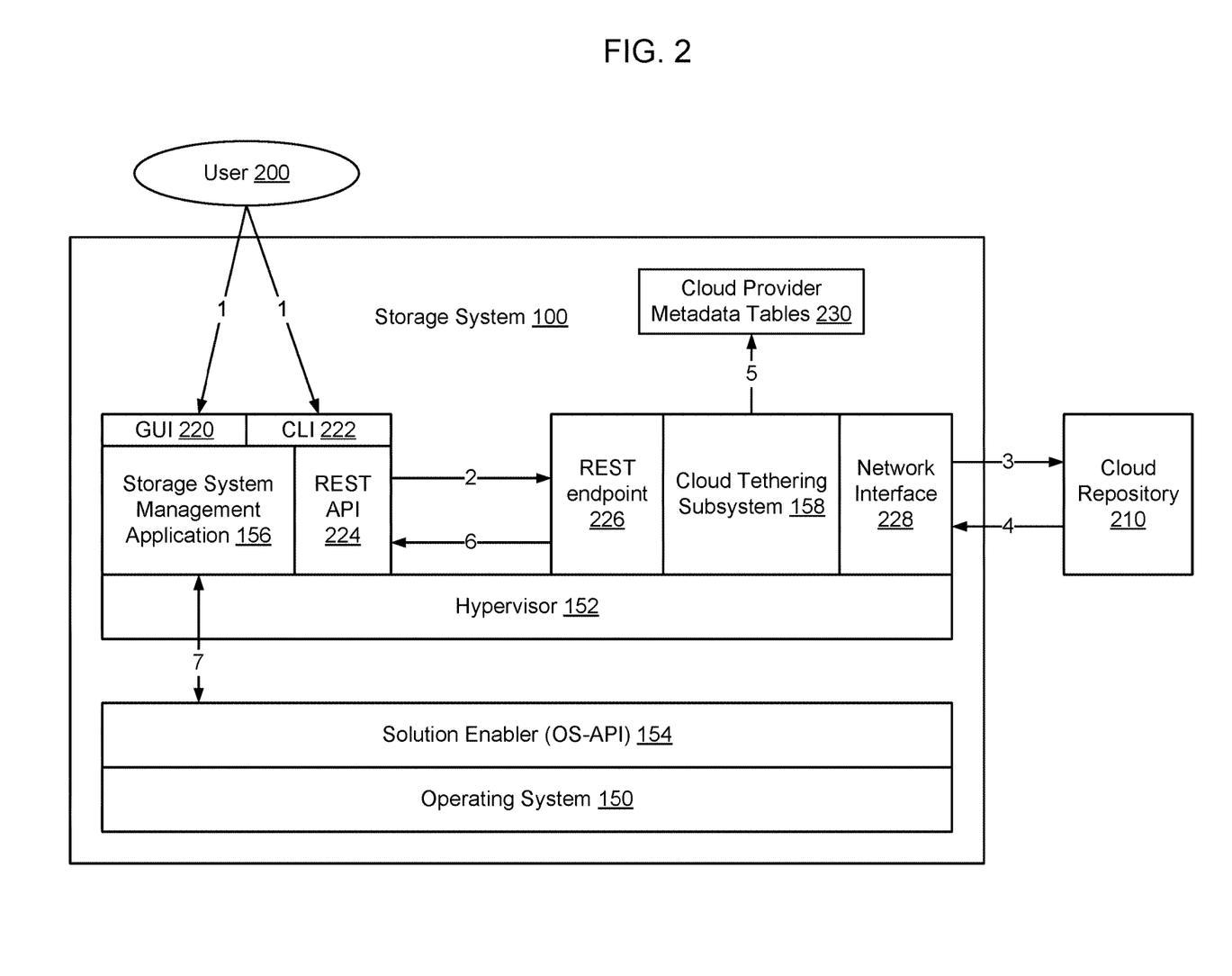
FIG. 2 is a functional block diagram of a storage system connected to a cloud repository, showing the aspects of the storage system configured to enable file systems to be sent to the cloud repository, according to some embodiments.

In some embodiments, operating system 150 is an embedded operating system of the storage system 100. An example operating system 150 may be based on Linux, although other operating systems may also be used. As shown in FIG. 2, hypervisor 152 is used to abstract the physical resources of the storage system, to enable at least some of the system applications to execute in emulations (e.g. virtual machines) on the storage system.

As shown in FIG. 2, solution enabler 154, in some embodiments, is an operating system utility configured to interact with the operating system to adjust operation of the storage system. Solution enabler 154, in some embodiments, acts as a middle layer between operating system 150 and the storage system management application 158 to enable the storage system management application to create environments on the storage system 100, create storage groups, install cloud providers on the storage system embedded operating system, and perform multiple other operations. Some example relevant operations implemented by the solution enabler 154 are discussed in greater detail below. In some embodiments, the solution enabler provides an API layer to the operating system 150, and accordingly is also referred to herein as an OS-API (Operating System Application Programing Interface).

The storage system management application 156 is an application executing in a container in the storage system 100. User 200 interacts with the storage system management application 156 via a GUI (Graphical User Interface) 220 or through a command line interface 222, and uses the storage system management application 156 to configure operation of the storage system 100. Of importance to this disclosure, in some embodiments upon receipt of a request from the user 200 to create a cloud provider, the storage system management application 156 includes control logic configured to automatically configure the requested cloud provider on the cloud tethering subsystem, test the connection to the cloud provider, and install the cloud provider in the storage system's embedded operating system 150. In some embodiments, the entire process of creating the cloud provider is fully automated once the request for creation of a cloud provider is received from the user.

Additionally, the storage system management application 156 includes control logic configured to enable the storage system management application to detect any differences in cloud provider information between the cloud tethering subsystem 158 and operating system 150, and to automatically reconcile the cloud provider information in the storage system embedded operating system 150, to ensure that all components of the storage system maintain a consistent view of the available cloud providers. In some embodiments, the entire process of verifying and synchronizing cloud provider information between the cloud tethering subsystem and the embedded operating system is fully automated and does not require the user to provide information about the set of cloud providers that should exist on the storage system. The synchronization verification process can be implemented automatically, without input from the user, or at the request of the user.

The cloud tethering subsystem 158 is responsible for creating cloud providers on the cloud repository 210 and managing transmission of snapshots and other volumes of data from the storage system 100 to the cloud repository 210 over network interfaces 228. For example, it may be desirable to move at least some of the snapshot copies created by snapshot subsystem 160 from the storage system 100 to a cloud repository 210, for example to free up space in the back-end drive arrays 130, or for many other reasons.

In some embodiments, if access to the cloud repository 210 is desired, the storage system management application 156 causes an instance of cloud tethering subsystem 158 to be created on the storage system 100 and implements an automated process of interconnecting the cloud tethering subsystem 158 with the storage system management application 156 and embedded operating system 150. In the following discussion, it is assumed that the cloud tethering subsystem 158 has been correctly instantiated on the storage system 100 and is ready to be used to communicate with external cloud repositories 210, for example to transmit snapshots of filesystems to the cloud repositories 210. A given storage system may have multiple instances of cloud tethering subsystem 158 instantiated thereon. A given cloud tethering subsystem 158 may have multiple cloud providers that it uses to store snapshots of different storage groups.

As noted above, the cloud tethering subsystem 158, in some embodiments, is used to move snapshots of filesystems to cloud repository 210. Snapshot subsystem 160, in some embodiments, is configured to create these "snapshots". A "snapshot," as that term is used herein, is a copy of a volume of data as that volume existed at a particular point in time. A snapshot of a production device 140, accordingly, is a copy of the data stored on the production device 140 as the data existed at the point in time when the snapshot was created. A snapshot can be either target-less (not linked to a TDev) or may be linked to a target TDev when created. When a snapshot of a production volume is created, the snapshot may include all of the data of the production volume, or only the changes to the production volume that have occurred since the previous snapshot was taken.

In some embodiments, a user will set policies on a group of LUNs referred to as a storage group. These policies define the frequency of the snapshot, the retention period of the snapshots, and optionally a cloud provider where the snapshots are to be stored. The frequency tells the snapshot subsystem 160 in the storage array 130 to create a snapshot against all the LUNs in a storage group at a regular cadence, as defined by the user 200. The sets of snapshots taken against a storage group are referred to as snapsets. The retention period defines the age of the snapshot when it should be deleted. If a cloud provider is specified, this parameter tells the storage array the identity of the cloud-based object repository (cloud provider) where the snapshots need to be shipped.

In connection with transmitting a snapshot to a cloud repository, a TDev is linked to the snapshot, and presented to the cloud tethering subsystem as a host device 142. The cloud tethering subsystem 158 then issues read operations on the snapshot, and sends the data to the cloud repository 210. To access storage resources of the storage system 100, the cloud tethering subsystem 158 issues read and write IO operations 146, which are received by front end adapter 126 of the storage system, and processed by the front-end adapter 126.

The cloud tethering subsystem 158 is the primary data mover that is responsible for moving IO traffic between the back-end drive array 130 in the storage system 100 and the remote cloud repository 210. For example, the cloud tethering subsystem 158 is responsible for handling the shipping and restoring snapshots to and from the cloud repositories 210. Accordingly, the health and environment of the cloud tethering subsystem 158 is important to enable access of this feature.

The cloud tethering subsystem 158 is able to communicate with multiple cloud repositories. Example cloud service providers, that are configured to implement cloud repositories 210, include ECS (Elastic Cloud Storage), Amazon S3, Google Cloud, and Microsoft Azure, although any number of cloud providers might be used.

Whenever access to cloud services is desired, it is necessary to create a "cloud provider" to act as an object repository in the cloud repository 210 and register the cloud provider in the cloud tethering subsystem 158 and in the storage system's embedded operating system 150. The term "cloud provider" is used herein to refer to a specific instance of cloud storage. Multiple "cloud providers" can therefore be created within a given cloud repository. For example, a user may have multiple storage groups created on the storage system 100, and want snapshots of the different storage groups to be stored separately in cloud storage.

Accordingly, the user could create a separate cloud provider for each of the storage groups, and then cause the cloud tethering subsystem 158 to ship the snapshots of the different storage groups to the different cloud providers. In some embodiments, the cloud tethering subsystem is agnostic as to which repository is used to implement a given cloud provider, such that all cloud providers may be configured within the same cloud repository 210 (e.g. all cloud providers could be configured within Amazon S3) or various cloud providers could be configured in different cloud repositories (e.g. some cloud providers could be created at Amazon S3 and some cloud providers could be created at Azure).

In some embodiments, cloud providers act as target end points, where the user defines a storage entity referred to herein as a "bucket". In general, when a user wants to create a new cloud provider, the storage system management application GUI 220 prompts the user to input the cloud provider type, the authentication information, and bucket endpoint. An example set of information that might be collected by the storage system management application and used to define a cloud provider, which in this example is an Amazon S3 cloud provider, is shown below in Table I:

TABLE I

| Parameter | Required (yes/no) | Type | Description |
| --- | --- | --- | --- |
| Key | Yes | String | AWSAccessKeyID |
| Secret | Yes | String | AWSSecretAccessKey |
| Bucket | No | String | Bucket |
| isSecure | No | String | Use HTTPS. Valid values are "true" and "false" |
| Port | No | Integer | Port |
| Storage Class | No | String | Storage Class |
| Region | No | String | Amazon region |

As discussed in greater detail in connection with FIG. 3, when the user requests creation of a cloud provider, the cloud tethering subsystem establishes a connection to the identified cloud repository 210, and the cloud repository creates the cloud provider instance. Information about the cloud provider is then provided to the cloud tethering subsystem. Table II shows an example configured cloud provider, which in this example is also at Amazon S3.

TABLE II

```
{
    "state": "online",
    "providerDetails": {
        "node": "s3.amazonaws.com",
        "isSecure": true,
        "accessKey": "key",
        "bucket": "xyz-1b362b64-c0d3-11e8-b9ad-000c29f79430-4on",
        "policy": null,
        "region": "us-east-1",
        "requestStyle": "auto",
        "port": 443,
    },
    "id": "0bc797d0-c0d3-11e8-94a2-000c29f79430",
    "repositoryId": "2b74de9e-cc2a-11ea-af14-005056865a33",
    "name": "Amazon Cloud",
    "provider": "amazon"
}
```

As shown above, once the CTS is fully configured on the storage system a user 200 is able to add one or more cloud providers so that the cloud tethering subsystem 159 can be used to ship volumes of data to the cloud repository 210. In some embodiments, this process is automated, such that the user is prompted for minimal initial information, and the storage system management application then manages creation of the cloud provider in both the cloud tethering subsystem and the embedded operating system 150.

Figure 3:
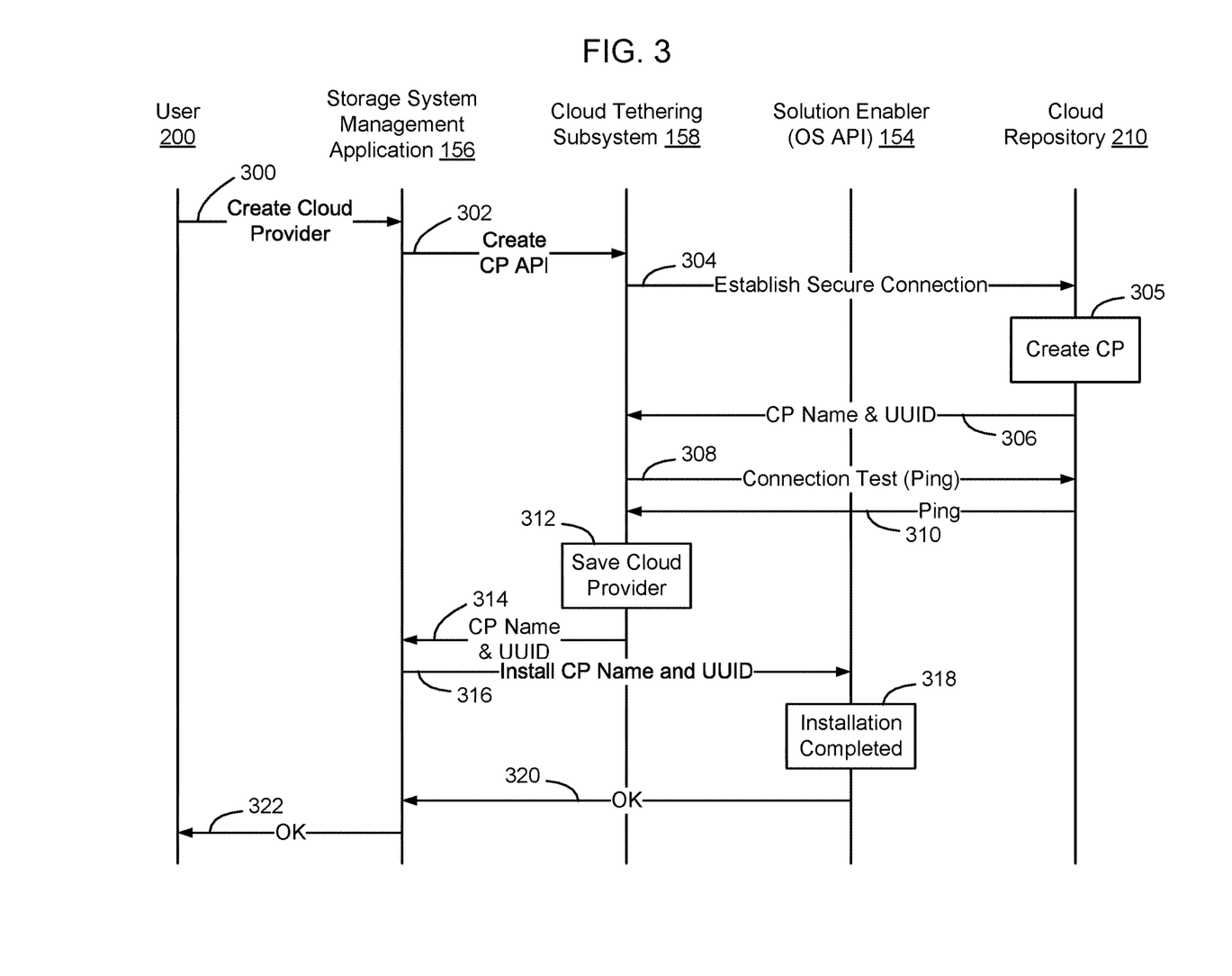
FIG. 3 is a swim lane diagram showing a process of configuring a cloud provider on a cloud tethering subsystem and in the storage system's embedded operating system, according to some embodiments.

FIG. 3 is a swim lane diagram showing an example process of configuring a cloud provider on a cloud tethering subsystem 158 and in the storage system embedded operating system 150, according to some embodiments. As shown in FIG. 3, in some embodiments the process of creating a cloud provider starts with the user providing input (FIG. 2, arrow 1; FIG. 3, arrow 300) to the storage system management application 156 via GUI 220 or CLI 222. In some embodiments, the user input is implemented by selecting (clicking or touching) a "create cloud provider" button on the GUI 220. Alternatively, the user input may be implemented using a REST API call to CLI 222. Example user input may include the name of the cloud repository and other information indicated above in connection with Table I.

Upon receipt of the required cloud provider information, the storage system management application 156 instructs the cloud tethering subsystem 158 to create the cloud provider API (FIG. 2, arrow 2; FIG. 3, arrow 302). As shown in FIG. 2, in some embodiments the storage system management application 156 has a Representational State Transfer (REST) Application Programming Interface (API) 224 that it uses to communicate with public REST and private REST endpoints 226 on the cloud tethering subsystem 158. In some embodiments the storage system management application pushes an instruction such as a "create cloud provider" API call with the required cloud provider configuration information to the cloud tethering system's REST endpoint 226 on REST API 224.

The cloud tethering subsystem 158 contacts the identified cloud provider and establishes a secure connection to the identified cloud provider (FIG. 2, arrow 3; FIG. 3, arrow 304). In some embodiments, the secure connection is used to transmit information about the desired cloud provider to the cloud repository 210. The cloud repository 210 creates an instance of a cloud provider in the cloud repository (block 305) and returns identifying information about the created cloud provider to the cloud tethering subsystem. Example cloud provider information might include the cloud provider name and UUID (Universally Unique Identifier) (FIG. 2, arrow 4; FIG. 3, arrow 306). Example details of an example cloud provider are shown in Table II. Once the connection is created and the cloud provider instance has been created on the cloud repository, in some embodiments the cloud tethering subsystem 158 tests the connection, for example by sending a ping (FIG. 3, arrows 308, 310).

Once the connection has been created and tested, the cloud provider information is stored by the cloud tethering subsystem in its cloud provider metadata tables 230 (FIG. 3, block 312). The cloud provider metadata tables, in some embodiments, are backed up frequently, for example every 30 minutes, to prevent cloud provider metadata from being lost in the event of a failure of the cloud tethering subsystem 158.

Once the cloud provider has been created, the cloud tethering subsystem 158 responds to the storage system management application 156 with the cloud provider name and UUID (FIG. 2, arrow 6; FIG. 3, arrow 314).

The storage system management application 156 the instructs the solution enabler (OS-API) 154 to create a matching cloud provider within a storage group associated with the cloud tethering subsystem 158 on the storage system (FIG. 2, arrow 7; FIG. 3, arrow 316). Once the cloud provider has successfully been installed in the operating system (FIG. 3, block 318) the solution enabler 154 notifies the storage system management application 156 (FIG. 3, arrow 320) of the successful creation of the requested cloud provider. Optionally, the storage system management application notifies the user 200 that the cloud provider has been successfully created on the storage system (FIG. 3, arrow 322). Once the cloud provider has been installed in both the storage system embedded operating system 150 and in the cloud tethering subsystem 158, the cloud provider is ready to be used. Accordingly, the cloud tethering subsystem 158 can ship snapshots that are created by the snapshot subsystem 160 to be stored in the object repository (cloud provider) on the cloud repository.

The cloud tethering subsystem 158 is an integral part of the entire cloud mobility solution for the storage system 100, and its sanctity at all stage is extremely important. Part of the sanctity of the cloud tethering subsystem 158 involves ensuring that the cloud tethering subsystem 158 and storage system embedded operating system 150 have a synchronized view of the set of available cloud providers.

Unfortunately, there are instances where the cloud provider information contained in the operating system may not be synchronized with the cloud provider information maintained by the cloud tethering subsystem 158. For example, the storage system may experience a failure which requires reinstallation of the storage system's embedded operating system 150. This may cause the list of cloud providers in the operating system to be partially or completely erased. As another example, a lack of synchronization between the cloud tethering subsystem 158 and operating system 150 may occur where the storage system management application 156 experiences a problem and needs to be reinstalled. Another example where synchronization may be lost is where cloud providers are imported from a remote storage system to the local storage system. During this import process it is possible for the imported cloud providers to be installed in the cloud tethering subsystem 158 but not installed in the operating system 150, for example, or vice-versa. Additionally, it is possible that a subsystem such as the solution enabler 154 might fail while a cloud provider is being created, which could cause the cloud provider to be created in the cloud tethering subsystem 158 but not installed in the operating system 150.

Figure 4:
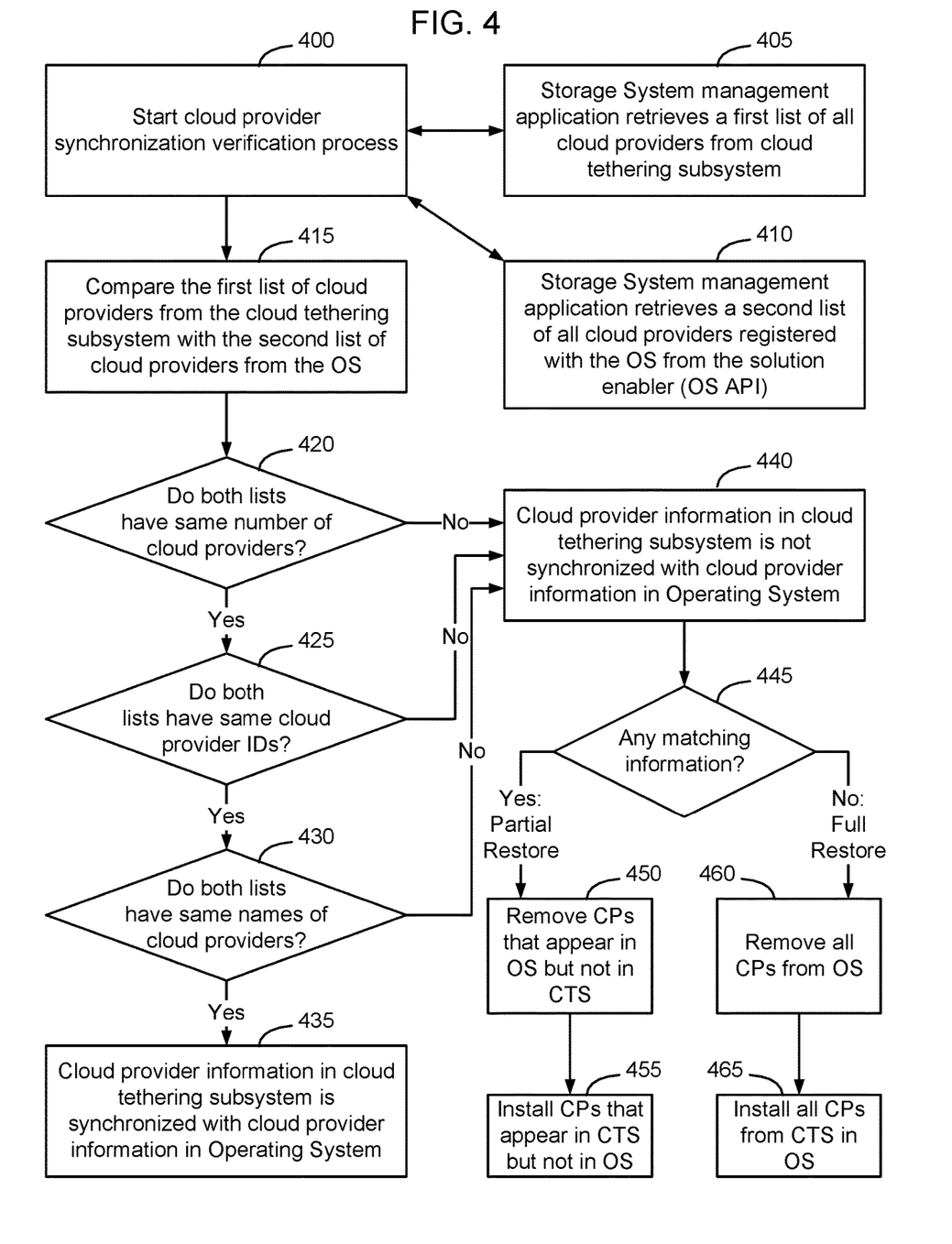
FIG. 4 is a flow chart of an example method of synchronizing cloud provider information between the cloud tethering subsystem and the storage system's embedded operating system, according to some embodiments.

FIG. 4 is a flow chart of an example method of synchronizing cloud provider information between a cloud tethering subsystem and the storage system operating system, according to some embodiments. As shown in FIG. 4, in block 400 the storage system management application 156 initiates a cloud provider synchronization verification process (block 400). The synchronization verification process may be started on demand, as instructed by the user. For example, if the storage system management application identifies a possible event that could cause a lack of synchronization, or discovers a discrepancy between cloud providers, the user may be presented with an option such as a "resolve" button on user interface 220 that the user can use to instruct the storage system management application 156 to initiate the process of synchronizing cloud provider information between the cloud tethering subsystem 158 and the operating system 150.

In some embodiments, the synchronization verification process can also be started by the storage system management application automatically, without user input. Automatic execution of the synchronization verification process can be event based or scheduled. For example, the storage system management application in some embodiments is configured to initiate the synchronization verification process based on occurrence of a particular events, for example if there in connection with detection of a failure of one of the components of the storage system that might cause a lack of synchronization of cloud provider information between the cloud tethering subsystem 158 and the operating system 150. Additionally, the synchronization verification process may be started automatically on a periodic basis, such as daily, to ensure that the cloud tethering subsystem 158 and the operating system 150 have consistent views of the cloud provider information.

Regardless of how the synchronization verification process is started, the storage system management application automatically maintains the consistency of the cloud provider information without input from the user, such that the user is not requested to provide information about the set of cloud providers that should be instantiated on the storage system. This makes it less of a burden on the user to implement the synchronization verification process. This enhances the overall user experience and preserves the cloud provider information securely without requiring the user to become involved in managing consistency of views of cloud providers within the storage system.

In connection with starting the cloud provider synchronization verification process, the storage system management application instructs the cloud tethering subsystem 158 to provide a first list of all cloud providers known by the cloud tethering subsystem (block 405). In some embodiments, the cloud tethering subsystem obtains the first list of known cloud providers from the cloud provider metadata tables 230. The storage system management application also instructs the solution enabler 154 to provide a second list of all cloud providers registered with the operating system 150. The storage system management application can obtain the first and second lists in either order or at the same time, and the terms "first" and "second" lists are used merely to distinguish the two lists from each other. In some embodiments the two lists are used to populate two data structures; in other embodiments the two lists are used to populate a common data structure.

Once the storage system management application 156 has retrieved the first and second lists, the storage system management application 156 compares the first list of cloud providers retrieved from the cloud tethering subsystem with the second list of cloud providers retrieved from the operating system (block 415). Several example comparisons that may be implemented in connection with determining whether the lists have the same cloud provider information are shown in FIG. 4 in blocks 420, 425, and 430. These comparisons may be implemented in any order or simultaneously, depending on the implementation, and the order shown in FIG. 4 is not intended to be limiting.

As shown in FIG. 4, in some embodiments the storage system management application 156 performs several comparisons to determine if the two lists of cloud provider information are synchronized. For example, in some embodiments the storage system management application determines whether both lists have the same number of cloud providers (block 420). If there are different numbers of cloud providers (a determination of NO at block 420), that is an indication that the lists don't match.

If the lists have the same numbers of cloud providers (a determination of YES at block 420), in some embodiments the storage system management application 156 determines if both lists have the same cloud provider UUIDs (block 425). If the lists do not have the same cloud provider UUIDs (a determination of NO at block 425), that is an indication that the lists do not match.

If the lists have the same cloud provider UUIDs (a determination of YES at block 425), in some embodiments the storage system management application 156 determines if both lists have the same cloud provider names (block 430). If the lists do not have the same cloud provider names (a determination of NO at block 430), that is an indication that the lists do not match.

If the storage system management application 156 determines that the lists are the same in each of the discussed comparisons (e.g. a determination of YES at blocks 420, 425, and 430), the storage system management application 156 determines that the cloud provider information in the cloud tethering subsystem is synchronized with the cloud provider information installed in the operating system 150 (block 435) and the process ends. Optionally the user may be notified via user interface 220 that the cloud provider synchronization verification process was executed and that all cloud providers maintained by the cloud tethering subsystem 158 are correctly installed in the operating system.

If the storage system management application 156 determines that there is a discrepancy between the first and second lists in connection with one or more of the comparisons (e.g. a determination of NO at block 420, 425, and/or 430), the storage system management application determines that the cloud provider information in the cloud tethering subsystem is not properly synchronized with the cloud provider information in the storage system embedded operating system (block 440).

In this instance, because the cloud provider information maintained by the cloud tethering subsystem 158 is maintained in cloud provider metadata tables 230, which are regularly backed up, the storage system management application 156 will implement changes to the cloud provider information maintained in the storage system's embedded operating system 150, to cause the cloud provider information in the operating system 150 to match the cloud provider information of the cloud tethering subsystem 158.

The particular manner in which the storage system management application 156 does this will depend on whether there is any matching information between the two lists (block 445). If there is some matching information between the first and second lists of cloud provider information (a determination of YES at block 445), the storage system management application 156 will do a partial restore of cloud provider information to the operating system 150 via the solution enabler 154. If there is no matching information (a determination of NO at block 445) the storage system management application 156 will do a full restore of cloud provider information to the operating system 150 via the solution enabler 154.

To do a partial restore of cloud provider information, in some embodiments, the storage system management application 156 compares the two lists and determines a first set of cloud providers which appear in the operating system's list but do not appear in the cloud tethering subsystem's list of cloud providers. The storage system management application 156 then instructs the solution enabler to remove those cloud providers that appear in the operating system list but are not included on the cloud tethering subsystem list (block 450). The storage system management application 156 also compares the two lists and determines a second set of cloud providers which appear in the cloud tethering subsystem's list but do not appear in the operating system's list of cloud providers. The storage system management application 156 then instructs the solution enabler 154 to install those cloud providers that appear in the cloud tethering subsystem's list but are not included on the operating system's list (block 455).

To do a full restore of cloud provider information, in some embodiments the storage system management application

156 instructs the solution enabler to remove all cloud providers from the operating system 150 (block 560). The storage system management application 156 then instructs the solution enabler to install all cloud providers included on the cloud tethering subsystem's list of cloud providers.

By configuring the storage system management application 156 to detect non-synchronization and to automatically correct and maintain a consistent view of cloud providers by the cloud tethering subsystem 158 and operating system 150, it is possible to greatly enhance reliability of the manner in which the storage system is able to connect to external cloud resources. Further, by implementing this without requiring user input, specifically by not requiring the user to provide additional details about which cloud providers should be instantiated on the storage system, the burden of maintaining this aspect of the storage solution is minimal to the end user.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of automating creation of a cloud provider on a storage system, comprising:
   receiving, by a storage system management application, user input identifying a cloud provider to be created on the storage system;
   in response to receiving the user input, and without further input from the user, automatically:
   instructing a cloud tethering subsystem, by the storage system management application, to create the cloud provider on a cloud repository, the cloud provider being a specific instance of cloud storage on the cloud repository that is configured to act as an object repository in the cloud repository;
   creating, by the cloud tethering subsystem, a secure connection to the cloud repository;
   receiving confirmation, by the cloud tethering subsystem, that the cloud repository has created the cloud provider; and
   instructing a solution enabler, by the storage system management application, to install the cloud provider in a storage system embedded operating system.

2. The method of claim 1, further comprising testing, by the cloud tethering subsystem, the secure connection to the cloud repository.

3. The method of claim 1, further comprising receiving, by the cloud tethering subsystem, details about the created cloud provider from the cloud repository.

4. The method of claim 3, further comprising storing the cloud provider details, by the cloud tethering subsystem, in cloud provider metadata tables.

5. The method of claim 4, further comprising backing up the cloud provider metadata tables to prevent loss of cloud provider metadata in the event of a failure of the cloud tethering subsystem.

6. The method of claim 1, wherein a cloud provider is a cloud-based object repository.

7. The method of claim 1, wherein the step of receiving confirmation that the cloud repository has created the cloud provider comprises receiving the cloud provider name and UUID (Universally Unique Identifier) from the cloud repository.

8. The method of claim 7, wherein the step of instructing the solution enabler to install the cloud provider in the storage system embedded operating system comprises providing the cloud provider name and UUID to the solution enabler.

9. The method of claim 1, wherein the solution enabler is a middleware layer providing an API (Application Programming Interface) to the storage system embedded operating system.

10. A non-transitory tangible computer readable storage medium having stored thereon a computer program for verifying synchronization of cloud provider information between components of a storage system, the computer program including a set of instructions which, when executed by a computer, cause the computer to perform a method comprising the steps of:
    instructing, by a storage system management application, a cloud tethering subsystem to provide a first list of cloud providers maintained by the cloud tethering subsystem;
    instructing, by the storage system management application, a solution enabler to provide a second list of cloud providers installed in a storage system embedded operating system;
    comparing, by the storage system management application, the cloud providers of the first list with the cloud providers of the second list; and
    determining whether the cloud providers of the first list are the same as the cloud providers of the second list; and
    if the cloud providers of the first list are not the same as the cloud providers of the second list, adjusting the cloud providers installed in the storage system embedded operating system to match the first list of cloud providers from the cloud tethering subsystem.

11. The non-transitory tangible computer readable storage medium of claim 10, wherein the step of adjusting comprises determining whether any cloud providers of the first list match any cloud providers of the second list.

12. The non-transitory tangible computer readable storage medium of claim 11, wherein if some of the cloud providers of the first list match some of the cloud providers of the second list, the storage system management application performs a partial restoration process by removing cloud providers from the operating system that appear on the second list but not on the first list, and installing cloud providers to the operating system that appear on the first list but not on the second list.

13. The non-transitory tangible computer readable storage medium of claim 11, wherein if none of the cloud providers of the first list match any of the cloud providers of the second list, the storage system management application performs a full restoration process by removing all cloud providers from the operating system that appear on the second list, and installing all cloud providers to the operating system that appear on the first list.

14. The non-transitory tangible computer readable storage medium of claim 10, wherein verifying synchronization of cloud provider information is implemented on a periodic basis without input from a user.

15. The non-transitory tangible computer readable storage medium of claim 10, further comprising determining, by the storage system management application, a potential lack of synchronization of cloud provider information, and automatically implementing the process of verifying synchronization of cloud provider information by the storage system management application without input from the user.

16. A non-transitory tangible computer readable storage medium having stored thereon a computer program for creating and maintaining a set of cloud providers on a storage system, the computer program including a set of instructions which, when executed by a computer, cause the computer to perform a method comprising the steps of:
creating, by a storage system management application, a set of cloud providers on a cloud tethering subsystem instantiated on the storage system and in an embedded operating system of the storage system;
determining that a cloud provider verification process should be used to compare a first set of cloud providers created on the cloud tethering subsystem with a second set of cloud providers created in the operating system;
instructing, by the storage system management application, the cloud tethering subsystem to provide a first list of cloud providers maintained by the cloud tethering subsystem;
instructing, by the storage system management application, a solution enabler to provide a second list of cloud providers installed in a storage system embedded operating system;
comparing, by the storage system management application, the cloud providers of the first list with the cloud providers of the second list; and
determining whether the cloud providers of the first list are the same as the cloud providers of the second list; and
if the cloud providers of the first list are not the same as the cloud providers of the second list, adjusting the cloud providers installed in the storage system embedded operating system to match the first list of cloud providers from the cloud tethering subsystem.

17. The non-transitory tangible computer readable storage medium of claim 16, wherein the step of creating, by a storage system management application, the set of cloud providers comprises implementing the following steps to create each cloud provider:
receiving, by a storage system management application, user input identifying a cloud provider to be created on the storage system;
instructing a cloud tethering subsystem, by the storage system management application, to create the cloud provider on a cloud repository;
creating, by the cloud tethering subsystem, a communication channel to the cloud repository;
receiving confirmation, by the cloud tethering subsystem, that the cloud repository has created the cloud provider; and
instructing a solution enabler, by the storage system management application, to install the cloud provider in a storage system embedded operating system.

18. The non-transitory tangible computer readable storage medium of claim 16, wherein the step of determining that the cloud provider verification process should be used comprises determining, by the storage system management application, that a failure event has occurred indicative of a possible lack of synchronization between the first set of cloud providers and the second set of cloud providers, and in response automatically executing the cloud provider verification process by the storage system management application without input from a user of the storage system management application.

19. The non-transitory tangible computer readable storage medium of claim 16, wherein the step of determining that the cloud provider verification process should be used comprises executing, by the storage system management application, the cloud provider verification process periodically on a predetermined schedule.

20. The non-transitory tangible computer readable storage medium of claim 17, wherein the cloud provider is a specific instance of cloud storage on a cloud repository, and wherein the steps of:
instructing the cloud tethering subsystem, by the storage system management application, to create the cloud provider on a cloud repository;
creating, by the cloud tethering subsystem, the communication channel to the cloud repository;
receiving confirmation, by the cloud tethering subsystem, that the cloud repository has created the cloud provider; and
instructing the solution enabler, by the storage system management application, to install the cloud provider in a storage system embedded operating system;
are performed automatically in response to receiving the user input, and without further input from the user.

* * * * *